United States Patent
Shih

(10) Patent No.: US 12,534,894 B2
(45) Date of Patent: Jan. 27, 2026

(54) WATER STOP STRUCTURE OF DRAIN VALVE

(71) Applicant: Tai-World Mfg. Co., Ltd., Changhua (TW)

(72) Inventor: Sen-Tien Shih, Changhua (TW)

(73) Assignee: Tai-World Mfg. Co., Ltd., Changhua (TW)

( * ) Notice: Subject to any disclaimer, the term of this patent is extended or adjusted under 35 U.S.C. 154(b) by 98 days.

(21) Appl. No.: 18/659,144

(22) Filed: May 9, 2024

(65) Prior Publication Data

US 2025/0347095 A1     Nov. 13, 2025

(51) Int. Cl.
| | | |
|---|---|---|
| *E03C 1/23* | (2006.01) | |
| *E03C 1/262* | (2006.01) | |
| *F16K 5/06* | (2006.01) | |
| *F16K 27/06* | (2006.01) | |

(52) U.S. Cl.
CPC ............ *E03C 1/2302* (2013.01); *E03C 1/262* (2013.01); *F16K 5/0657* (2013.01); *F16K 27/067* (2013.01)

(58) Field of Classification Search
CPC ...... E03C 1/2302; E03C 1/262; F16K 5/0657; F16K 27/067
See application file for complete search history.

(56) References Cited

U.S. PATENT DOCUMENTS

| | | | | |
|---|---|---|---|---|
| 3,499,628 | A * | 3/1970 | Schwartz | F16K 27/067 251/309 |
| 6,058,526 | A * | 5/2000 | Parisi | E03C 1/23 4/287 |
| 6,609,259 | B2 * | 8/2003 | Cantrell | E03C 1/23 4/640 |
| 9,194,111 | B2 * | 11/2015 | Bohacik | F16K 5/0652 |

* cited by examiner

*Primary Examiner* — Janie M Loeppke
(74) *Attorney, Agent, or Firm* — Demian K. Jackson; Jackson IPG PLLC

(57) ABSTRACT

A water stop structure of a drain valve contains a body, a ball valve, a first support ring, a second support ring, a positioning ring, a control device, and a filter basket. At least two arcuate protrusions of a second support ring and at least two arcuate recesses of a body changeably contact with one another to produce a water-stopping effect. When the ball valve is adjustably rotated, a second support ring automatically moves upward and downward with the ball valve. When the second support ring moves upward and downward, the at least two arcuate protrusions and the at least two arcuate recesses contact with one another to maintain water stopping effect and damping of rotation of the ball valve, thus enhancing a manufacturing yield, lowering a fabrication cost, avoiding an easy abrasion, and obtaining a high seal effect, a durable material and a secure operation.

10 Claims, 10 Drawing Sheets

WATER STOP STRUCTURE OF DRAIN VALVE

TECHNICAL FIELD

The present invention relates to a water stop structure of a drain valve fixed below a water sink to obtain a shifting of stopping and draining water.

BACKGROUND

Commercial or industrial establishments (such as restaurants and institutions generally) have large-capacity sinks to wash or rinse remaining materials on dishes, pots, pans, and similar items before washing them. Since the large capacity of these sinks and the chemicals used in washing or rinsing operations are irritating and corrosive to the drain valve area, simple plugs are not usually used to block the drains of these sinks. The draining outlet is provided with a food-grade acid and alkali-resistant drain valve for the user to open or close the draining outlet to control the discharge of water.

As shown in FIG. 10, a conventional food drain valve which is acid and alkali contains a body 91 having a hollow structure to define a flow path of liquid, a ball valve 92 rotatably received in the flow path of the liquids, wherein the ball valve rotates between a closing position of closing the liquid and an opening position of opening the liquid; a control device 93 configured to rotate the ball valve between the closing position of closing the liquid and the opening position of opening the liquid; a keeper 94 fixed to and in the body 91 and configured to maintain the ball valve 92 in the body 91; an annular holder 95 disposed between the ball valve 92 and the keeper 94 to closely abut against the ball valve 92; an O-shaped ring 96 closely mounted on the annular holder 95 and the body 91; and a resilient element 97 disposed between the annular holder 95 and the keeper 94 to realistically press the annular holder 95 on the ball valve 92.

However, the O-shaped ring 96 of such a conventional food drain valve has to be made of acid and alkali-resistant material, thus causing a low manufacturing yield and a high fabrication cost. Also, improper installation may lead to a water leakage. After a period of use time, the O-shaped ring 96 may wear out and fail to shorten a service life and require frequent replacements of the O-shaped ring 96, thus affecting using convenience and practicality of the drain valve.

The present invention has arisen to mitigate and/or obviate the afore-described disadvantages.

SUMMARY

The primary aspect of the present invention is to provide a water-stop structure of a drain valve by which at least two arcuate protrusions of a second support ring and at least two arcuate recesses of a body changeably contact with one another to produce a water-stopping effect; when a ball valve is adjustably rotated, a second support ring automatically moves upward and downward with a roughness of a surface of the ball valve, and when the second support ring moves upward and downward, the at least two arcuate protrusions and the at least two arcuate recesses contact with one another to maintain water stopping effect and damping of rotation of the ball valve, thus enhancing a manufacturing yield, lowering a fabrication cost, avoiding an easy abrasion, and obtaining a high seal effect, a durable material and a secure operation.

To obtain above-mentioned aspects, a water stop structure of a drain valve provided by the present invention contains a body, a ball valve, a first support ring, a second support ring, a positioning ring, a control device, and a filter basket.

The body is made of metal, and the body includes a chamber defined in the body. The chamber has an obliquely conical abutting face formed on an upper portion of an inner wall thereof, and a diameter of the obliquely conical abutting face is gradually reduced from a top of the obliquely conical abutting face to a bottom of the obliquely conical abutting face. The obliquely conical abutting face has at least two arcuate recesses defined thereon, and a diameter of a respective one arcuate recess of the at least two arcuate recesses is reduced from a top of the respective one arcuate recess to a bottom of the respective one arcuate recess, the body further includes a first receiving orifice defined on a top thereof and communicating with the chamber, and the first receiving orifice has a first threaded section formed on an inner wall thereof, the body includes a coupling orifice defined on a other side thereof and communicating with the chamber, and a second receiving orifice defined on a bottom of the body and communicating with the chamber.

The ball valve is rotatably received in the chamber, and the ball valve includes a first discharge orifice, a second discharge orifice, and a stop face which are defined around the ball valve in turn. The first discharge orifice and the second discharge orifice communicate with each other.

The second support ring is made of a non-metallic material and is circular, and the second support ring includes an arcuate face defined on an inner wall thereof, a top of the chamber and above the ball valve, a resilient element accommodated in a top of the second support ring. The second support ring further includes an obliquely conical abutting face formed on an outer wall thereof, and a diameter of the obliquely conical abutting face is reduced from a top of the obliquely conical abutting face to a bottom of the obliquely conical abutting face, the obliquely conical abutting face has at least two arcuate protrusions corresponding to the at least two arcuate recesses. A diameter of a respective one arcuate protrusion of the at least one arcuate protrusions is reduced from a top of the respective one arcuate protrusion to a bottom of the respective one arcuate protrusion, and a radian of the respective one arcuate protrusion is smaller than a radian of the respective one arcuate recess, such that the at least two arcuate protrusions and the at least two arcuate recesses contact with one another to stop water closely, and a movably annular stop line is defined between the respective one arcuate protrusion and the respective one arcuate recess so that when the second support ring is driven by the ball valve to move upward and downward, the at least two arcuate protrusions and the at least two arcuate recesses changeably contact with one another at different positions to produce a height change, to maintain a water stopping effect and a damping of a rotation of the ball valve.

The positioning ring includes a through orifice defined on a center of the positioning ring and formed in a circle shape, a second threaded section formed on an outer wall of the positioning ring and configured to screw with the first threaded section, a bottom of the positioning ring is biased against the resilient element so that the resilient element forces the second support ring and the positioning ring.

The connection portion is connected with the ball valve and is configured to control the ball valve to rotate.

DETAILED DESCRIPTION

Figure 1:
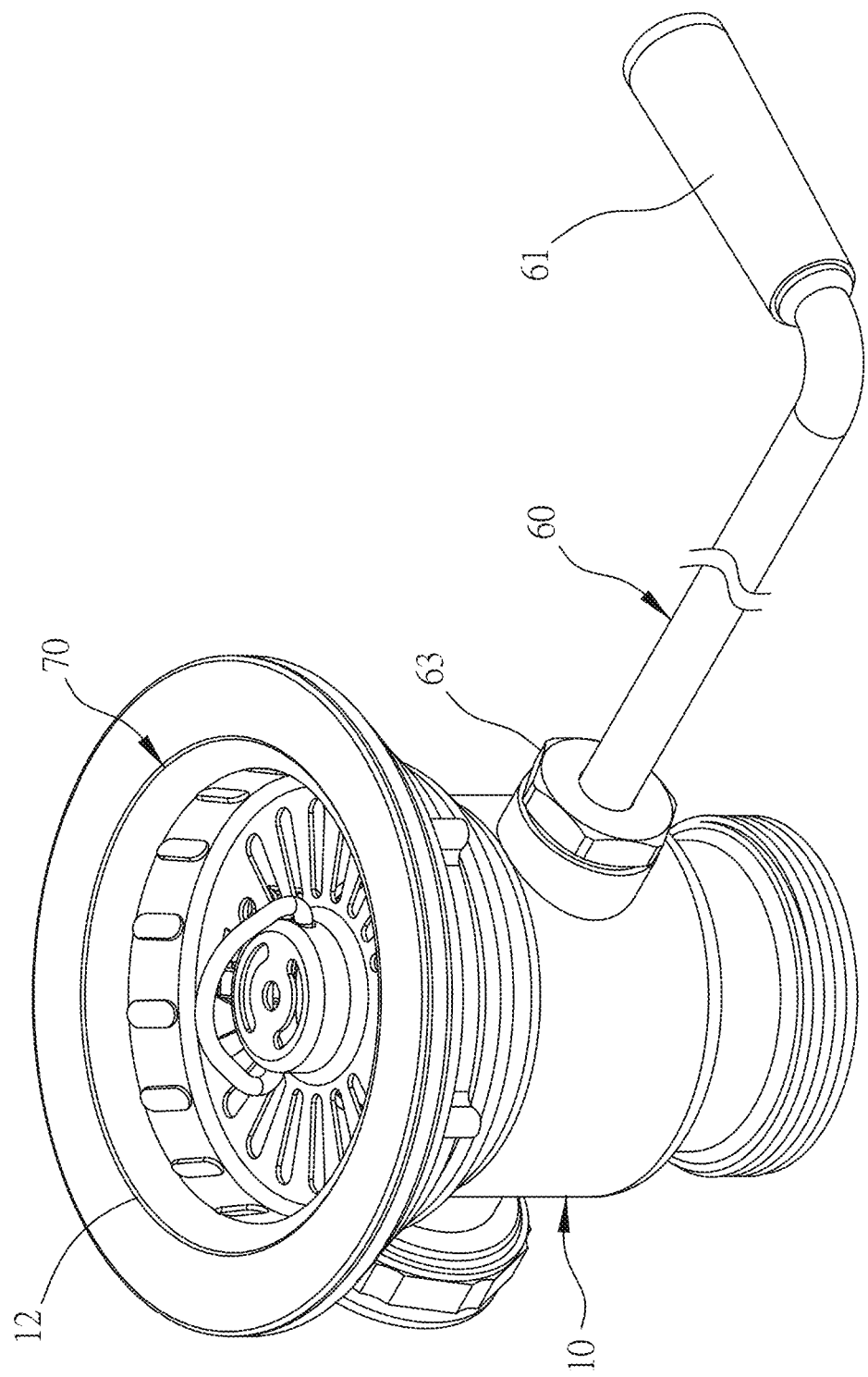
FIG. 1 is a perspective view showing the assembly of a water stop structure of a drain valve according to a preferred embodiment of the present invention.
Figure 2:
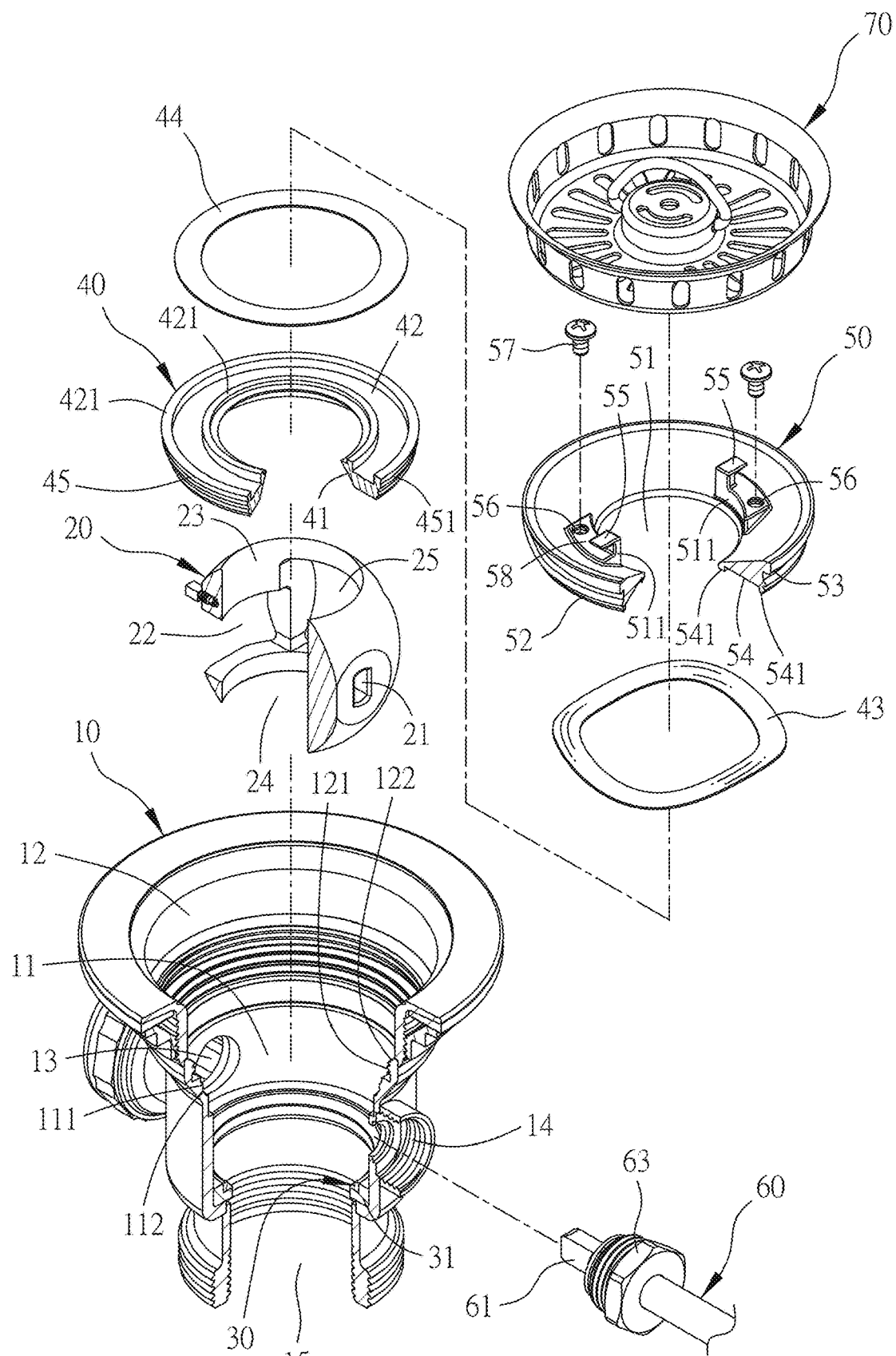
FIG. 2 is a perspective view showing the exploded components of the water stop structure of the drain valve according to the preferred embodiment of the present invention.
Figure 3:
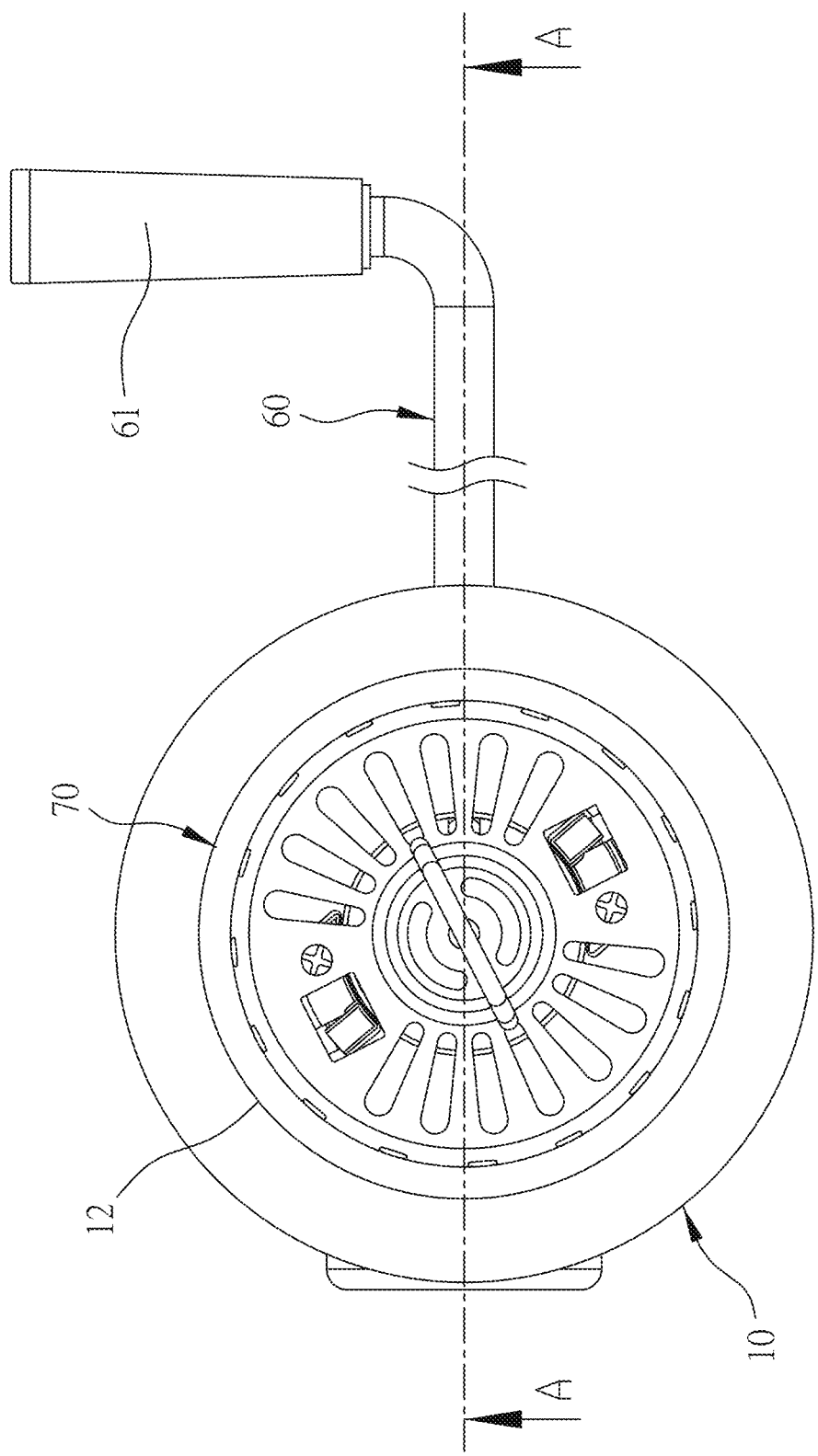
FIG. 3 is a top plan view showing the assembly of the water stop structure of the drain valve according to the preferred embodiment of the present invention.

With reference to FIGS. 1-7, a water stop structure of a drain valve according to a preferred embodiment of the present invention comprises a body 10, a ball valve 20, a first support ring 30, a second support ring 40, a positioning ring 50, a control device 60, and a filter basket 70.

The body 10 is made of metal, and the body 10 includes a chamber 11 defined therein, wherein the chamber 11 has an obliquely conical abutting face 111 formed on an upper portion of an inner wall thereof, and a diameter of the obliquely conical abutting face 111 is gradually reduced from a top of the obliquely conical abutting face 111 to a bottom of the obliquely conical abutting face 111, wherein the obliquely conical abutting face 111 has at least two arcuate recesses 112 defined thereon, and any two adjacent arcuate recesses 112 are spaced from a distance, wherein a diameter of a respective one arcuate recess 112 of the at least two arcuate recesses 112 is reduced from a top of the respective one arcuate recess 112 to a bottom of the respective one arcuate recess 112. The body 10 further includes a first receiving orifice 12 defined on a top thereof and communicating with the chamber 11, wherein a diameter of the first receiving orifice 12 is equal to or greater than a diameter of the chamber 11, and the first receiving orifice 12 has a first threaded section 121 formed on an inner wall thereof, a first tilted biasing face 122 formed on a top of the first threaded section 121. The body 10 includes a draining orifice 13 defined on a side thereof and communicating with the chamber 11, a coupling orifice 14 defined on the other side thereof and communicating with the chamber 11, and a second receiving orifice 15 defined on a bottom of the body 10 and communicating with the chamber 11. In this embodiment, the body 10 is made of stainless steel, and two arcuate recesses 112 are provided.

The ball valve 20 is rotatably received in the chamber 11, and the ball valve 20 includes a fixing orifice 21 defined on a side thereof, an overflow orifice 22 formed on the other side of the ball valve 20 opposite to the fixing orifice 21, a first discharge orifice 23, a second discharge orifice 24, a third discharge orifice 25, and a stop face 26 which are defined between the fixing orifice 21 and the overflow orifice 22, wherein the overflow orifice 22, the first discharge orifice 23, the second discharge orifice 24 and the third discharge orifice 25 communicate with one another.

The first support ring 30 is circular and is mounted on a bottom of the chamber 11, the first support ring 30 includes an arc-shaped face formed on a top thereof and located below the ball valve 20, and the first support ring 30 is located on a reinforcement loop 31.

The second support ring 40 is made of non-metallic material and is circular, and the second support ring 40 includes an arcuate face 41 defined on an inner wall thereof, a top of the chamber 11 and above the ball valve 20, a trench 42 formed on a top of the second support ring 20, and a resilient element 43 and a washer which are both accommodated in the trench 43, wherein the resilient element 43 is stacked on the washer 44, the trench 42 has two ribs 421 extending on two sides thereof. The second support ring 40 further includes an obliquely conical abutting face 45 formed on an outer wall thereof, and a diameter of the obliquely conical abutting face 45 is reduced from a top of the obliquely conical abutting face 45 to a bottom of the obliquely conical abutting face 45. The obliquely conical abutting face 45 has at least two arcuate protrusions 451 corresponding to the at least two arcuate recesses 112, wherein a diameter of a respective one arcuate protrusion 451 of the at least two arcuate protrusions 451 is reduced from a top of the respective one arcuate protrusion 451 to a bottom of the respective one arcuate protrusion 451, and a radian of the respective one arcuate protrusion 451 is smaller than a radian of the respective one arcuate recess 112, such that the at least two arcuate protrusions 451 and the at least two arcuate recesses 112 contact with one another to stop water closely, and a movably annular stop line is defined between the respective one arcuate protrusion 451 and the respective one arcuate recess 112 so that when the second support ring 40 is driven by the ball valve 20 to move upward and downward, the at least two arcuate protrusions 451 and the at least two arcuate recesses 112 changeably contact with one another at different positions to maintain a water stopping effect and a damping of a rotation of the ball valve 20. In this embodiment, the second support ring 40 is made of polytetrafluoroethylene (PTFE), the resilient element 43 is a spring ring piece, and two arcuate protrusions 451 are provided.

The positioning ring 50 includes a through orifice 51 defined on a center thereof and formed in a circle shape, a second threaded section 52 formed on an outer wall of the positioning ring 50 and configured to screw with the first threaded section 121, and a second tilted biasing face 53 contacting with the first tilted biasing face 122, wherein a slope of the second tilted biasing face 53 is different from a slope of the first tilted biasing face 122, such that an angle difference is formed between the slope of the second tilted biasing face 53 and the slope of the first tilted biasing face 122, thus producing the water stopping effect. The positioning ring 50 further includes a pressing portion 54 formed on a bottom thereof and configured to press the resilient element 43 so that the resilient element 43 is abutted against the second support ring 40 and the positioning ring 50. The pressing portion 54 has two shoulders 541 formed on two sides thereof so that the two shoulders 541 are fitted with the two ribs 421 to stop the water flowing into the trench 42. The through orifice 51 has a beveled face extending from an outer wall thereof to a bottom of a center of the through orifice 51, wherein the beveled face of the through orifice 51 has at least one holder, and a respective one holder of the at least one holder has at least locking foot 55, at least one locking orifice 56 configured to lock with a screw 57, and at least one shrink portion 58 defined between the at least one locking foot 55 and the at least one locking orifice 56, wherein the at least one locking foot 55, the at least one locking orifice 56, and the at least one shrink portion 58 are concentric with the through orifice 51.

Figure 4:
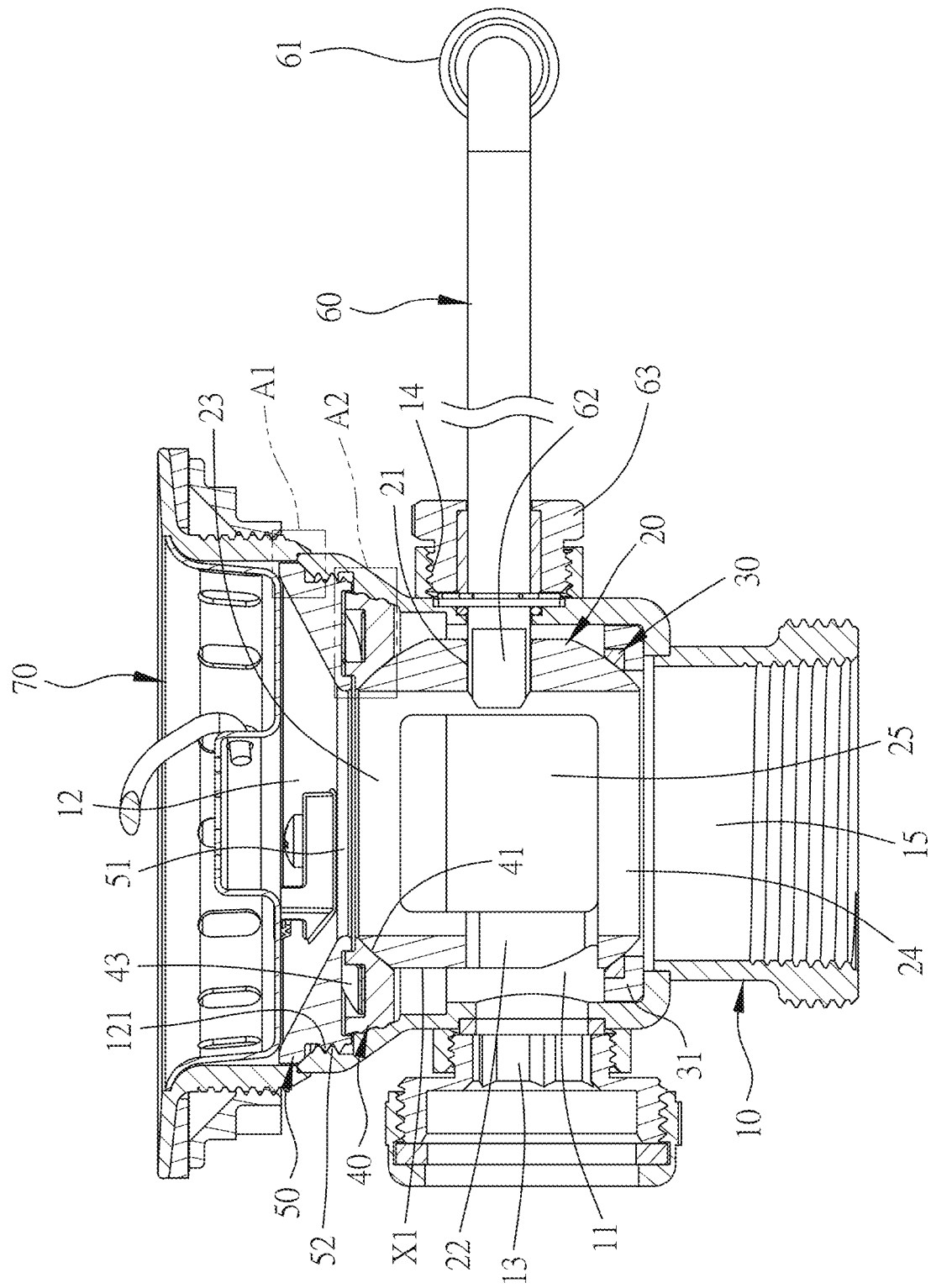
FIG. 4 is a cross sectional view taken along the line A-A of FIG. 3 and showing the operation of the water stop structure.
Figure 5:
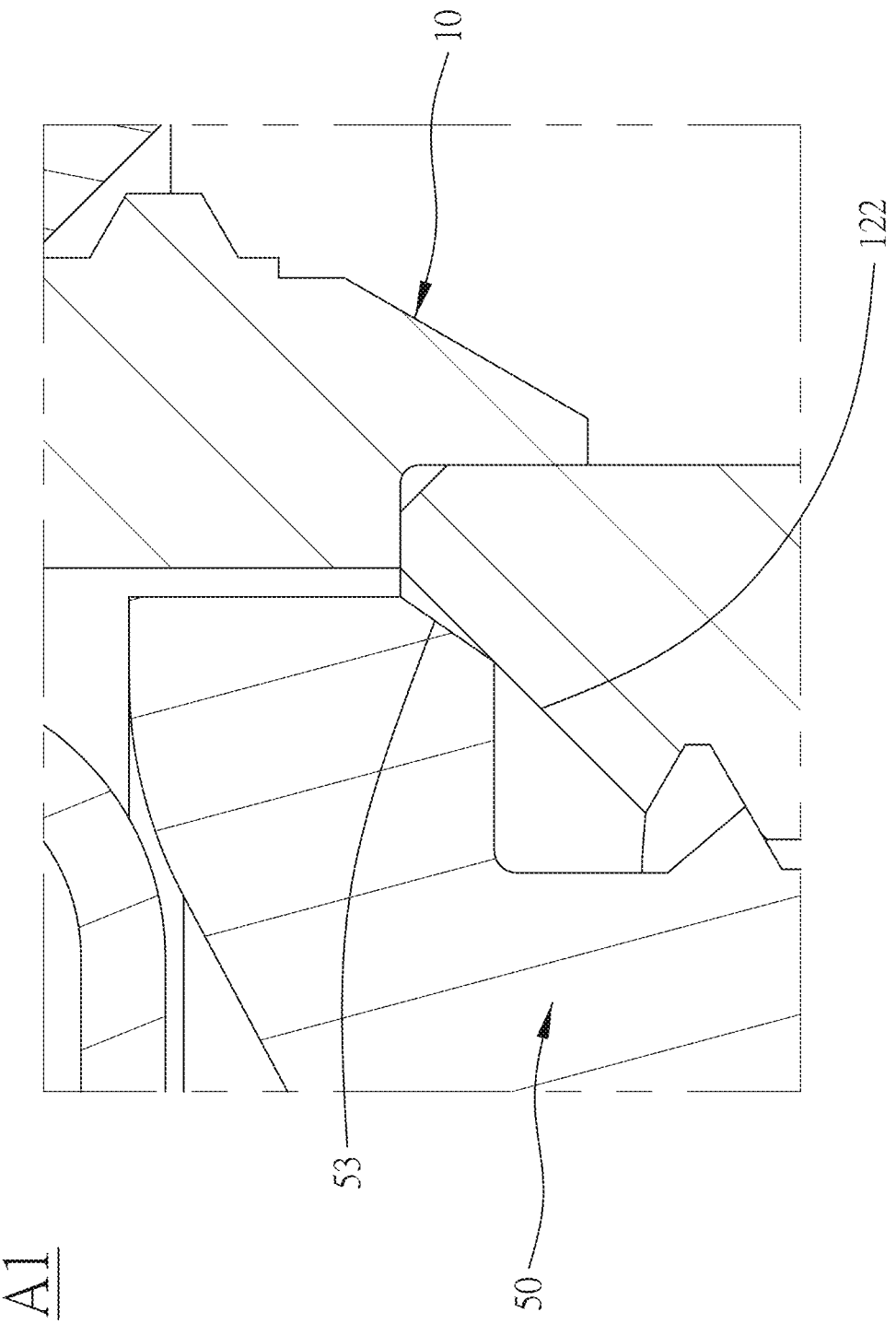
FIG. 5 is an amplified cross-sectional view of a portion A1 of FIG. 4.
Figure 6:
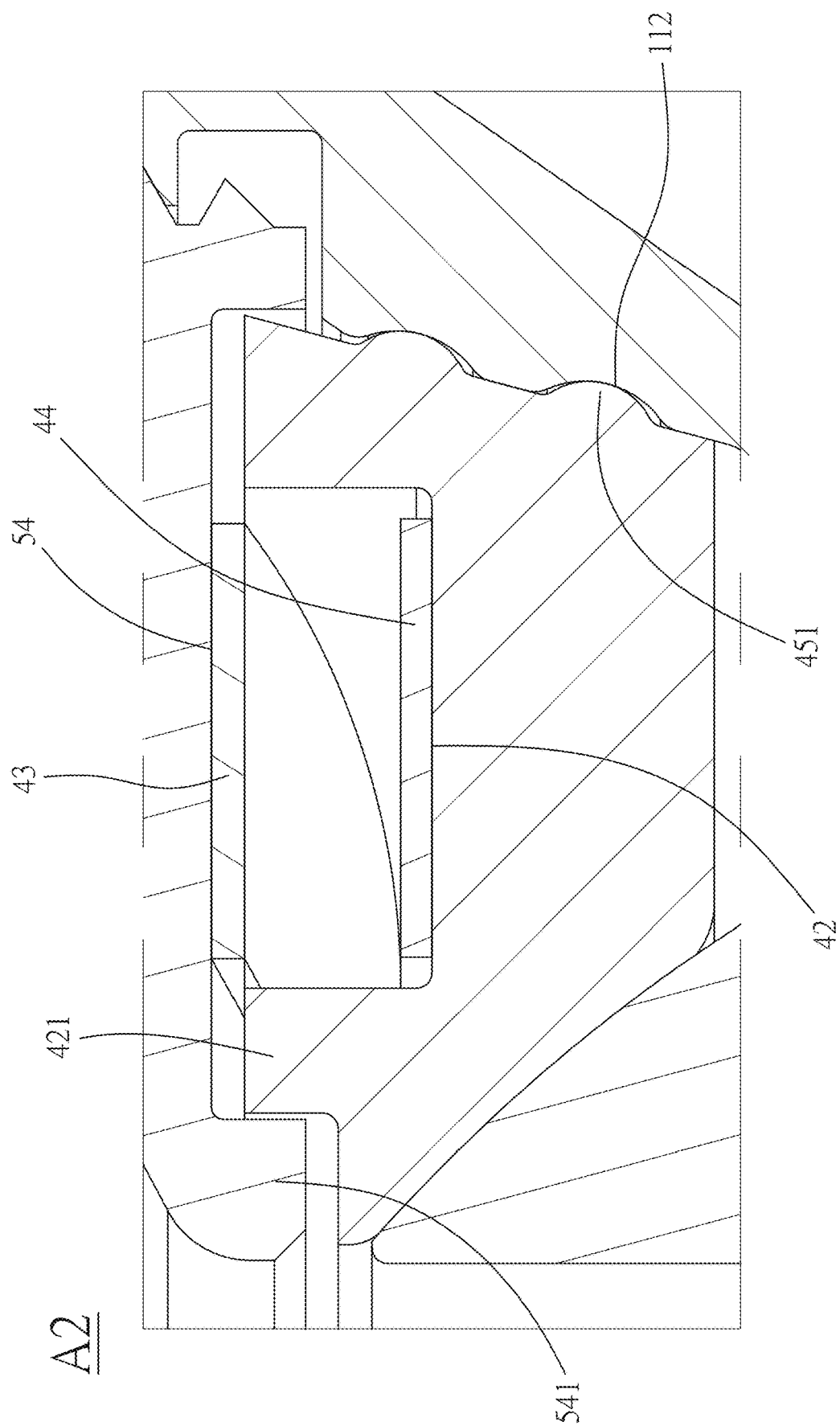
FIG. 6 is an amplified cross-sectional view of a portion A2 of FIG. 4.
Figure 7:
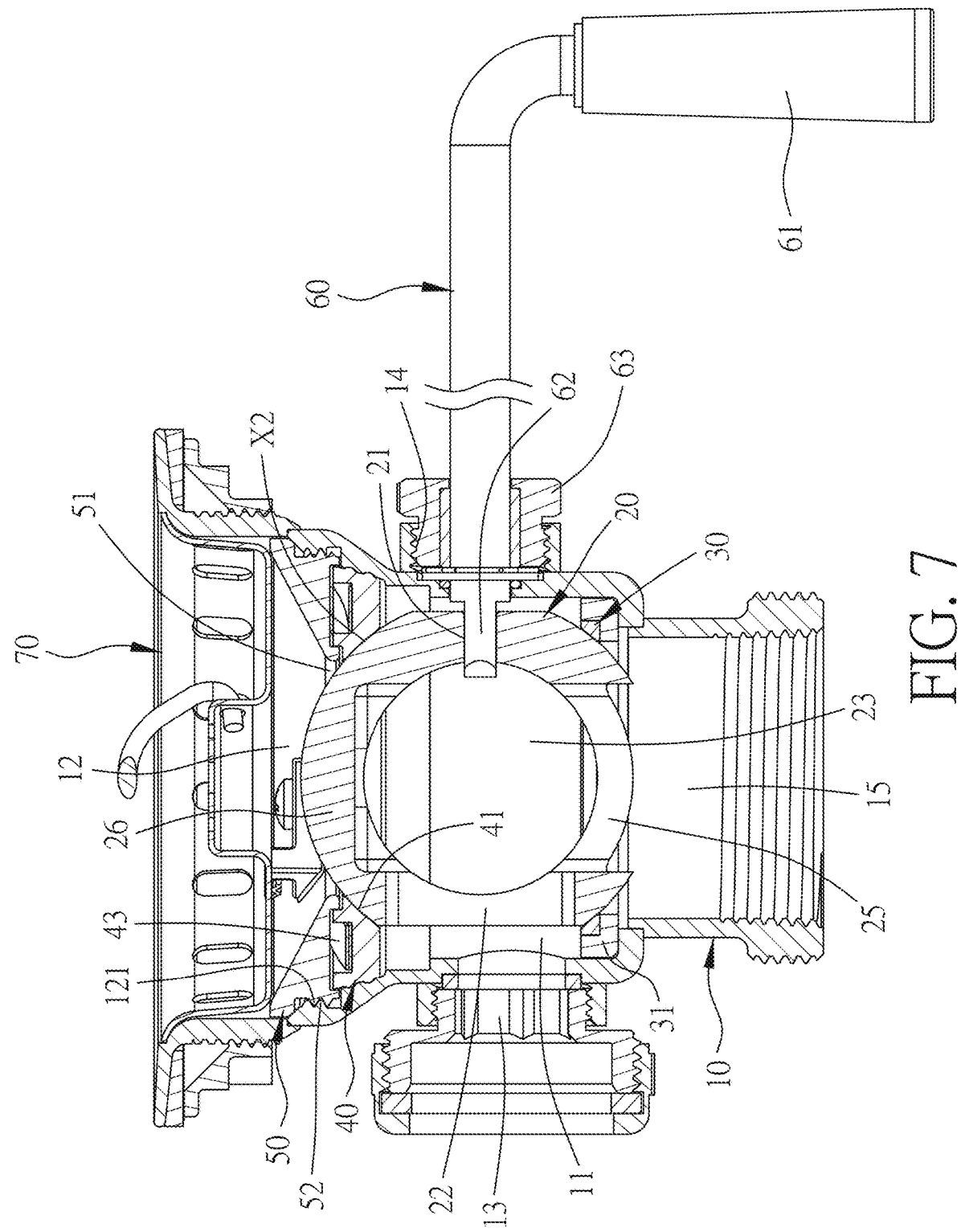
FIG. 7 is a cross sectional view showing the operation of the water stop structure of the drain valve according to the preferred embodiment of the present invention.

The control device 60 includes a connection portion 61 arranged on an end thereof, an operation portion 62 arranged on the other end of the control device 60, wherein the connection portion 61 is connected with the fixing orifice 21 of the ball valve 20 so that the control device 60 controls the ball valve 20 to rotate between a first position X1 (as shown in FIG. 4) and a second position X2 (as illustrated in FIG. 7), wherein the control device 60 further includes a limiting element 63 fixed adjacent to the connecting portion 61 and received in the coupling orifice 14 to achieve the position limitation.

The filter basket 70 is disposed on a top of the first receiving orifice 12.

Referring to FIG. 4, when the drain valve is turned on to discharge the water, as shown in FIG. 4, the operation portion 62 is operated to control the ball valve 20 to rotate toward the first position X1, and the ball valve 20 is completely covered by the first support ring 30 and the second support ring 40 so that the first discharge orifice 23 is aligned with the first receiving orifice 12, the second discharge orifice 24 is aligned with the second receiving orifice 15, and the draining orifice 13 is aligned with the overflow orifice 22.

When the drain valve is turned off to stop the water, as illustrated in FIG. 7, the operation portion 62 is operated to control the ball valve 20 to rotate toward the second position X2, and the ball valve 20 is completely covered by the first support ring 30 and the second support ring 40 so that the stop face 26 closes the first receiving orifice 12, the third discharge orifice 25 is aligned with the second receiving orifice 15, and the draining orifice 13 is aligned with the overflow orifice 22.

Figure 8:
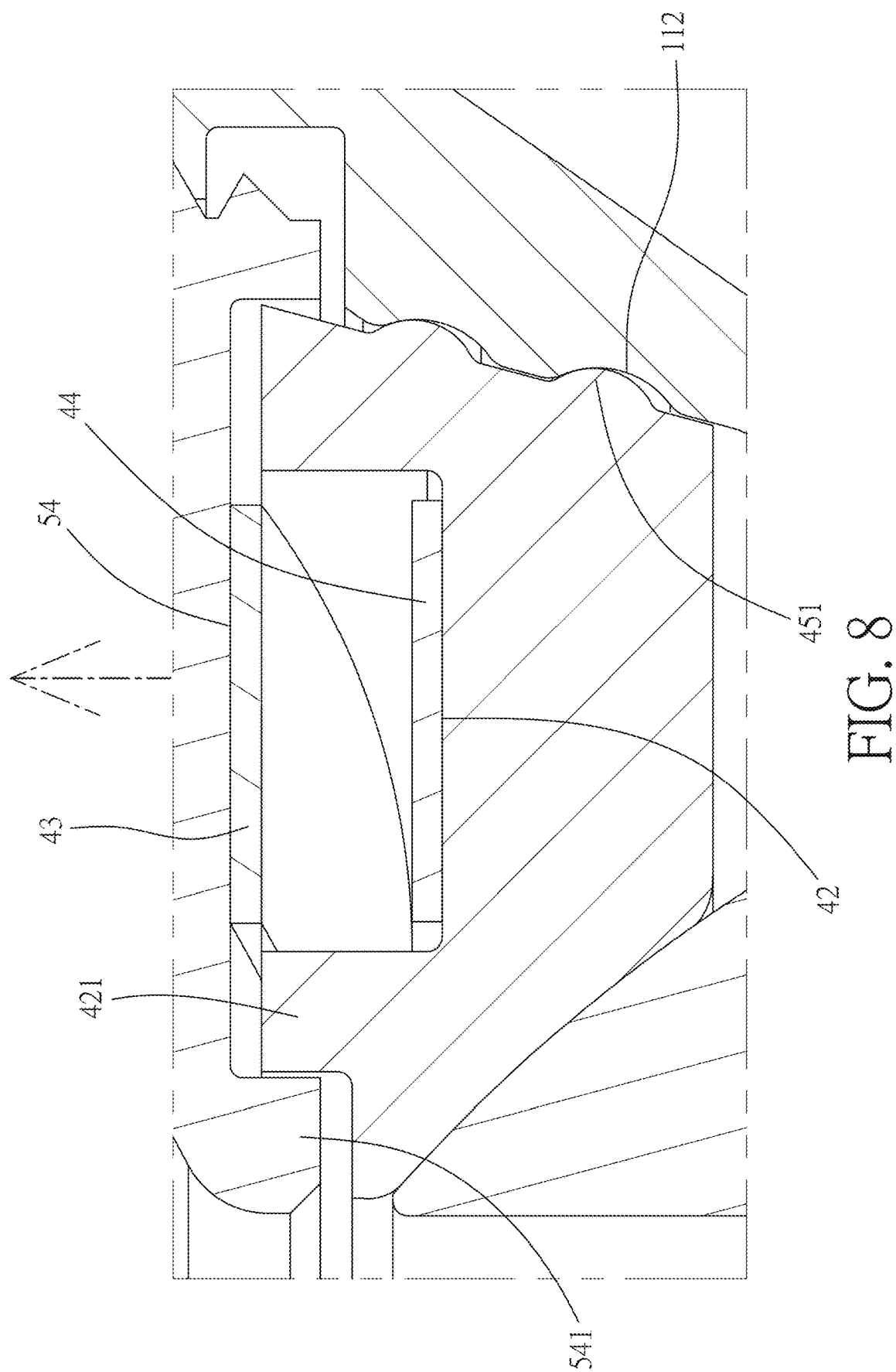
FIG. 8 is another cross sectional view showing the operation of the water stop structure of the drain valve according to the preferred embodiment of the present invention.
Figure 9:
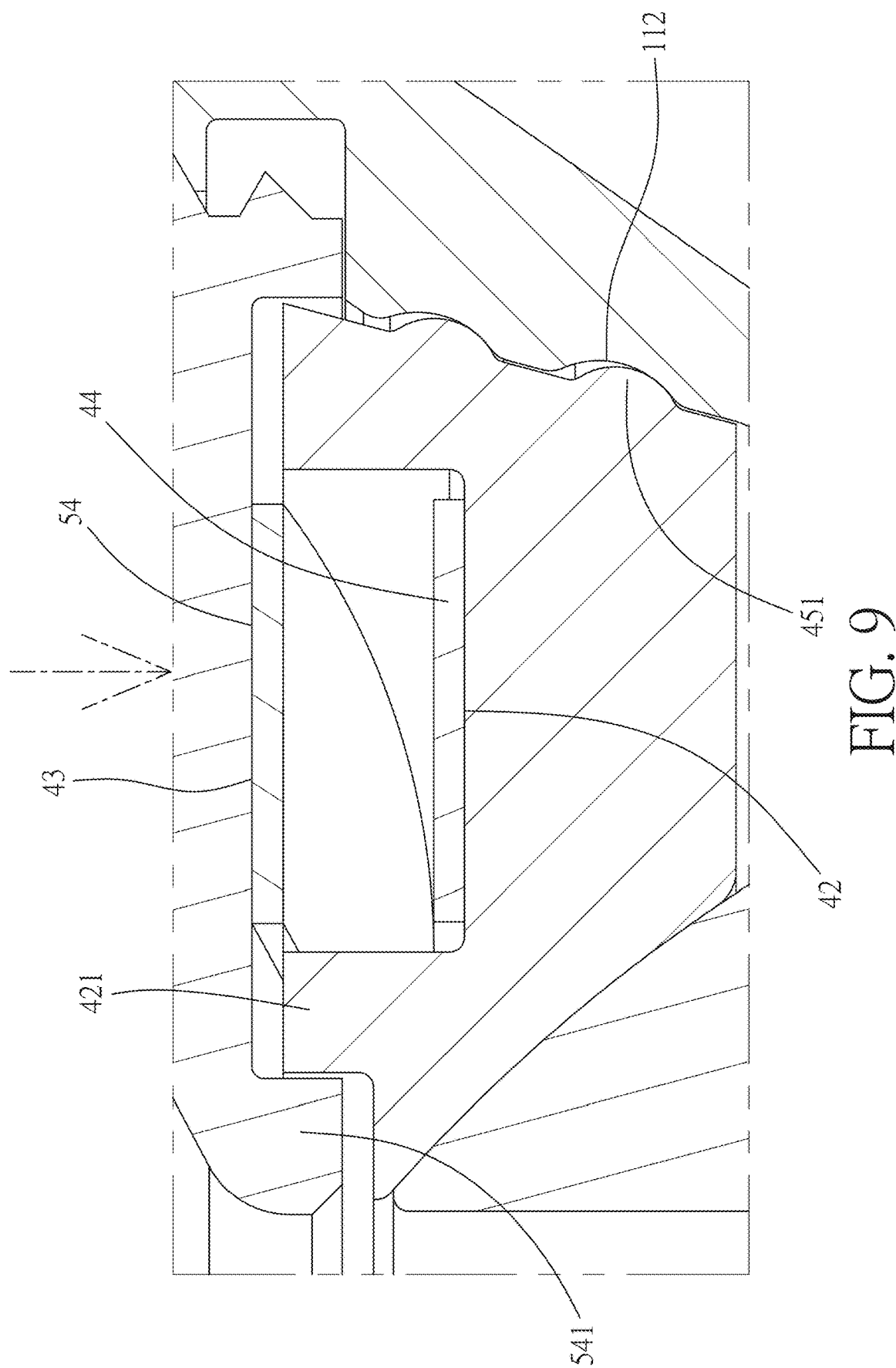
FIG. 9 is also another cross sectional view showing the operation of the water stop structure of the drain valve according to the preferred embodiment of the present invention.
Figure 10:
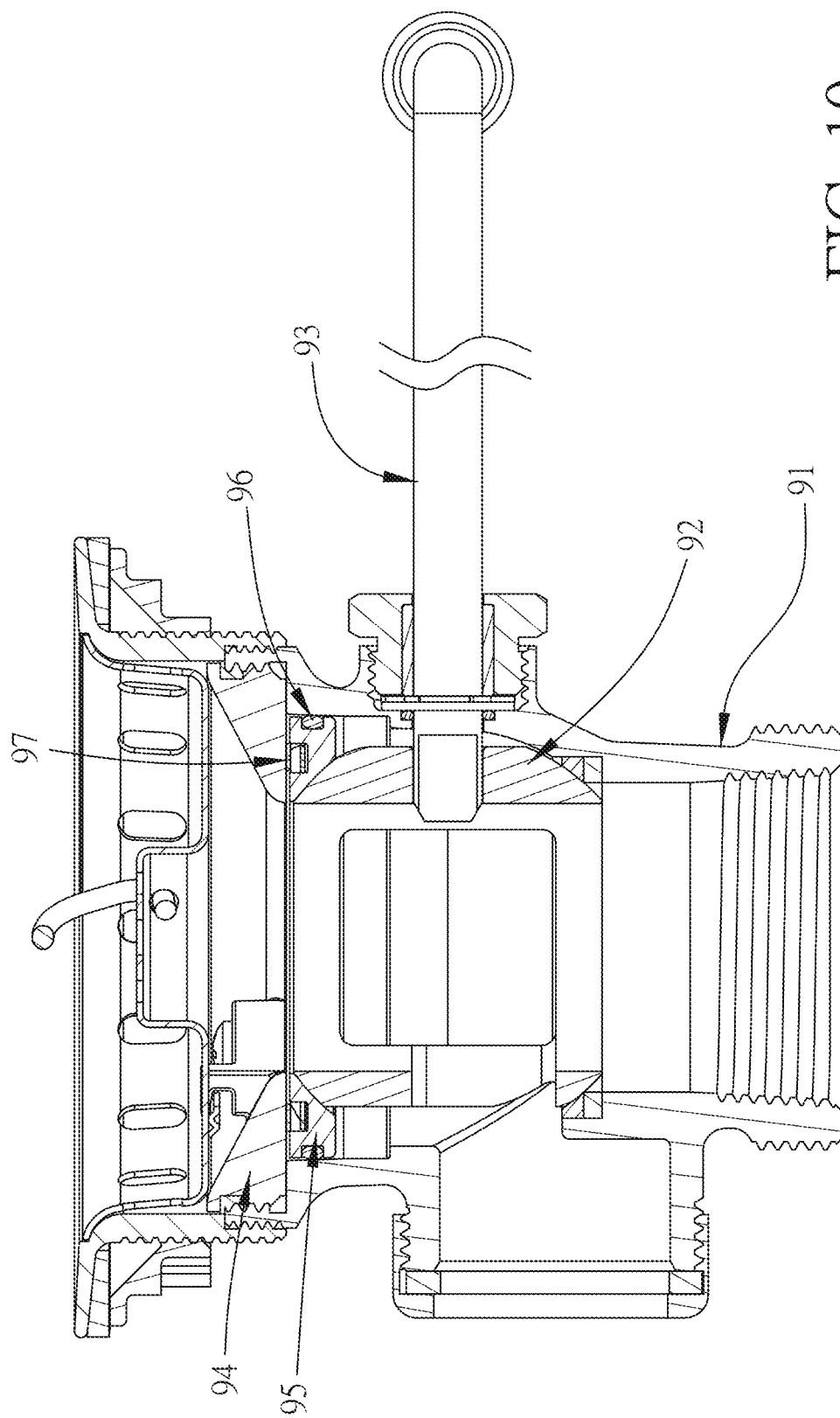
FIG. 10 is a cross sectional view of a conventional drain valve.

To overcome a poor roundness or a machining error of a surface of the ball valve 20, the ball valve 20 is adjustably rotated as shown in FIGS. 8 and 9, wherein the second support ring 40 automatically moves upward and downward with the roughness of the surface of the ball valve 20 by using the resilient element 43, and when the second support ring 40 moves upward and downward, the at least two arcuate protrusions 451 and the at least two arcuate recesses 112 changeably contact with one another at the different positions to produce a height change and to maintain the water stopping effect and the damping of the rotation of the ball valve 20 at a predetermined valve, thus enhancing a manual operation, an operation stability and smoothness.

Thereby, the water stop structure of the drain valve of the present invention has advantages as follows:

The at least two arcuate protrusions 451 of the second support ring 40 and the at least two arcuate recesses 112 of the body 10 changeably contact with one another to produce the water-stopping effect. When the ball valve 20 is adjustably rotated, the second support ring 40 automatically moves upward and downward with the roughness of the surface of the ball valve 20, and when the second support ring 40 moves upward and downward, the at least two arcuate protrusions 451 and the at least two arcuate recesses 112 contacts with one another to maintain the water stopping effect and the damping of the rotation of the ball valve 20, thus enhancing a manufacturing yield, lowering a fabrication cost, avoiding an easy abrasion, and obtaining a high seal effect, a durable material and a secure operation.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A water stop structure of a drain valve comprising:
   a body made of metal, and the body including a chamber defined in the body, wherein the chamber has an obliquely conical abutting face formed on an upper portion of an inner wall thereof, and a diameter of the obliquely conical abutting face is gradually reduced from a top of the obliquely conical abutting face to a bottom of the obliquely conical abutting face, wherein the obliquely conical abutting face has at least two arcuate recesses defined thereon, and a diameter of a respective one arcuate recess of the at least two arcuate recesses is reduced from a top of the respective one arcuate recess to a bottom of the respective one arcuate recess, the body further includes a first receiving orifice defined on a top thereof and communicating with the chamber, and the first receiving orifice has a first threaded section formed on an inner wall thereof, the body includes a coupling orifice defined on a other side thereof and communicating with the chamber, and a second receiving orifice defined on a bottom of the body and communicating with the chamber;
   a ball valve rotatably received in the chamber, and the ball valve including a first discharge orifice, a second discharge orifice, and a stop face which are defined around the ball valve in turn, wherein the first discharge orifice and the second discharge orifice communicate with each other;
   a second support ring made of non-metallic material and being circular, and the second support ring including an arcuate face defined on an inner wall thereof, a top of the chamber and above the ball valve, a resilient element accommodated in a top of the second support ring, wherein the second support ring further includes an obliquely conical abutting face formed on an outer wall thereof, and a diameter of the obliquely conical abutting face is reduced from a top of the obliquely conical abutting face to a bottom of the obliquely conical abutting face, the obliquely conical abutting face has at least two arcuate protrusions corresponding to the at least two arcuate recesses, wherein a diameter of a respective one arcuate protrusion of the at least one arcuate protrusions is reduced from a top of the respective one arcuate protrusion to a bottom of the respective one arcuate protrusion, and a radian of the respective one arcuate protrusion is smaller than a radian of the respective one arcuate recess, such that the at least two arcuate protrusions and the at least two arcuate recesses contact with one another to stop water closely, and a movably annular stop line is defined between the respective one arcuate protrusion and the respective one arcuate recess so that when the second support ring is driven by the ball valve to move upward and downward, the at least two arcuate protrusions and the at least two arcuate recesses changeably contact with one another at different positions to produce a height change, to maintain a water stopping effect and a damping of a rotation of the ball valve;

a positioning ring including a through orifice defined on a center of the positioning ring and formed in a circle shape, a second threaded section formed on an outer wall of the positioning ring and configured to screw with the first threaded section, a bottom of the positioning ring is biased against the resilient element so that the resilient element forces the second support ring and the positioning ring; and a connection portion connected with the ball valve and configured to control the ball valve to rotate.

2. The water stop structure as claimed in claim 1, wherein the body further includes a first tilted biasing face formed on a top of the first threaded section, the positioning ring includes a second tilted biasing face contacting with the first tilted biasing face, wherein a slope of the second tilted biasing face is different from a slope of the first tilted biasing face, such that an angle difference is formed between the slope of the second tilted biasing face and the slope of the first tilted biasing face, thus producing the water stopping effect.

3. The water stop structure as claimed in claim 1, wherein the body includes a draining orifice defined on a side thereof and communicating with the chamber, the ball valve includes a fixing orifice defined on a side thereof, an overflow orifice formed on the other side of the ball valve opposite to the fixing orifice, the ball valve further includes a third discharge orifice, wherein the overflow orifice, the third discharge orifice, the first discharge orifice, and the second discharge orifice communicate with one another; the control device includes a connection portion arranged on an end thereof and an operation portion arranged on the other end of the control device, wherein the connection portion is connected with the fixing orifice of the ball valve.

4. The water stop structure as claimed in claim 1 further comprises a first support ring which is circular and is mounted on a bottom of the chamber, wherein the first support ring includes an arc-shaped face formed on a top thereof and located below the ball valve, and the first support ring is located on a reinforcement loop.

5. The water stop structure as claimed in claim 1, wherein a washer is accommodated in a trench of the second support ring, and the resilient element is stacked on the washer.

6. The water stop structure as claimed in claim 1, wherein the second supporting ring includes a trench formed on a top thereof, the positioning ring further includes a pressing portion formed on a bottom thereof, and the resilient element is abutted against the trench and the pressing portion, the trench has two ribs extending on two sides thereof, the pressing portion has two shoulders formed on two sides thereof so that the two shoulders are fitted with the two ribs to stop the water flowing into the trench.

7. The water stop structure as claimed in claim 1, wherein the second support ring is made of polytetrafluoroethylene (PTFE), the resilient element is a spring ring piece.

8. The water stop structure as claimed in claim 1, wherein the through orifice has a beveled face extending from an outer wall thereof to a bottom of a center of the through orifice, wherein the beveled face of the through orifice has at least one holder, and a respective one holder of the at least one holder has at least locking foot, at least one locking orifice configured to lock with a screw, and at least one shrink portion defined between the at least one locking foot and the at least one locking orifice, wherein the at least one locking foot, the at least one locking orifice, and the at least one shrink portion are concentric with the through orifice.

9. The water stop structure as claimed in claim 1, further comprises a filter basket which is disposed on a top of the first receiving orifice.

10. The water stop structure as claimed in claim 1, wherein the control device further includes a limiting element fixed adjacent to the connecting portion and received in the coupling orifice to achieve the position limitation.

* * * * *